United States Patent [19]

Thevenon

[11] Patent Number: 4,842,353
[45] Date of Patent: Jun. 27, 1989

[54] DIFFRACTION APPARATUS WITH CORRECTING GRATING AND METHOD OF MAKING

[75] Inventor: Alain Thevenon, Bretigny-Sur-Orge, France

[73] Assignee: Instruments S.A., France

[21] Appl. No.: 787,243

[22] Filed: Oct. 11, 1985

[30] Foreign Application Priority Data

Oct. 19, 1984 [FR] France .................. 84 16027

[51] Int. Cl.[4] .................. G01J 3/18; G02B 5/32; G03H 1/04
[52] U.S. Cl. .................. 350/3.7; 350/3.83; 356/328; 356/334
[58] Field of Search .................. 350/3.6, 3.65, 3.7, 350/3.72, 3.83; 356/328, 334

[56] References Cited

U.S. PATENT DOCUMENTS 4,378,142  3/1983  Ono .................. 350/3.6 X
4,432,597  2/1984  Bjorklund et al. .................. 350/3.85 X

OTHER PUBLICATIONS

Cordelle, J., et al., "Aberration–Corrected Concave Gratings Made Holographically," *Optical Instruments and Techniques* 1969, J. Home Dickson, ed., Oriel Press Ltd., Newcastle, U.K., pp. 117–124.
(S1665004) Chipman, R. A., "Monochromator Designs With Aberration Corrected Gratings,"

*Primary Examiner*—John K. Corbin
*Assistant Examiner*—David J. Edmondson
*Attorney, Agent, or Firm*—Handal & Morofsky

[57] ABSTRACT

A method of making a corrected plane holographic grating within one band of wavelengths, intended for use in a diffraction apparatus in which light emitted by an entry source (1) is collimated by a spherical mirror (2) to the grating (4), which reflects parallel pencils to another spherical mirror (7), a focusing mirror, is disclosed. An auxiliary holographic grating (25) is created by the interference on a spherical surface (15) of a parallel pencil of light produced by the spherical mirror (7) subsequent to reflection onto a plane mirror (12) and of a divergent pencil deriving from the center of the surface (15). The auxiliary grating, corrected by the interference on a plane surface (22) of a parallel pencil produced by the spherical mirror (2) and of another parallel pencil produced by the auxiliary grating (25) illuminated from the center of the spherical surface, is then recorded.

25 Claims, 2 Drawing Sheets

DIFFRACTION APPARATUS WITH CORRECTING GRATING AND METHOD OF MAKING

TECHNICAL FIELD

The present invention concerns a diffraction apparatus, such as a spectrograph or monochromator, of the type that employs two spherical concave mirrors and a flat grating with increased aberration correction. It also concerns a method of holographically recording the plane grating employed in the apparatus.

BACKGROUND OF THE INVENTION

The inventive apparatus is utilized, for example, in Raman spectroscopy. The light that is to be analyzed is introduced through an entry slit positioned at an off-axis focal point of a collimator that consists of a spherical mirror. The mirror reflects a parallel pencil of light to a plane diffraction grating. The grating diffracts the light and reflects it in several parallel pencils to another spherical concave mirror, which acts as a focusing mirror. The result is separate images of the entry slit for each wavelength of incoming light. It is then possible, when the apparatus is employed as a spectrograph, to record or observe the whole resulting spectrum or, when the apparatus is employed as a monochromator, to isolate a single wavelength at one exit slit.

The collimating and focusing mirrors in an apparatus of this type are employed off axis and produce aberrations, especially spherically aberrations, which may also be accompanied by coma and astigmatism.

The object of the present invention is to reduce these aberrations as much as possible by correcting them by means of a particular arrangement of the lines on a corrected plane grating in such away that the lines will exhibit very slight deviations in parallelism and pitch. The corrected grating is a holographic grating, and another object of the invention is accordingly the method employed to holographically record it.

DISCLOSURE OF THE INVENTION

The method of holographically recording a corrected plane grating in accordance with the invention comprises the two successive stages of A. Creating an auxiliary spherical grating by holographically recording the interference fringes of two monochromatic pencils of the same wavelength within the correction band, namely
- a parallel pencil generated by one of the spherical mirrors in the apparatus from a source located at the associated operational focal point subsequent to reflection onto a plane mirror located at the grating, and
- a divergent pencil arriving from another source located at the center of the spherical surface, on a spherical concave surface, and B. creating the final plane grating by holographically recording the interference fringes of two monochromatic pencils of the same wavelength employed in the initial stage, namely
- a parallel pencil generated by the other spherical mirror in the apparatus from a source located at the associated operational focal point, and
- a parallel pencil generated by reflection onto the auxiliary grating from another source located at the center of the surface that the grating is recorded on, onto a plane surface positioned where the grating usually is within the apparatus.

BRIEF DESCRIPTION OF THE DRAWINGS

The invention will now be described with reference to the attached drawings, wherein.

BEST MODE FOR CARRYING OUT THE INVENTION

Figure 1:
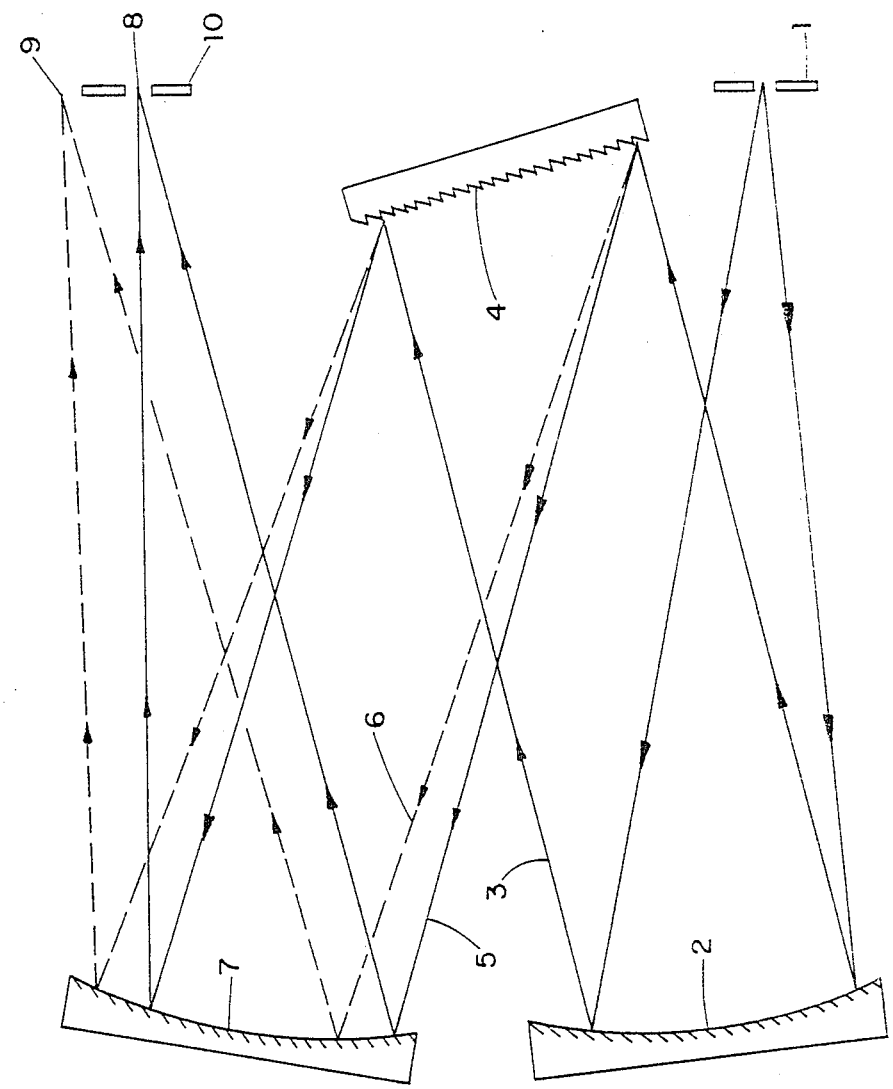
FIG. 1 is an optical diagram illustrating both the state of the art and apparatus in accordance with the invention, the only difference being in the arrangement of the lines on the plane grating.

FIG. 1 illustrates the usual elements of a conventional diffraction apparatus, which is employed in this case as a monochromator. The light to be analyzed is introduced through an entry slit 1 located at an off-axis focal point of a spherical mirror 2, which accordingly relfects it as a parallel pencil 3 of light to a plane diffraction grating 4. Grating 4 reflects the light as a plurality of parallel pencils, 5 and 6 for instance, each one of a different wavelength, to another spherical mirror 7, which acts as a focusing mirror. Thus, different images 8 and 9 of entry slit 1 are obtained for each wavelength of the light introduced at the slit, and it is possible to isolate a desired wavelength at an exit slit 10.

The diffraction apparatus created in accordance with the invention employs exactly the same optical configuration except that the particular position and shape of lines on flat grating 4 allows the aberrations introduced by spherical mirrors 2 and 7 to be corrected.

Figure 2B:
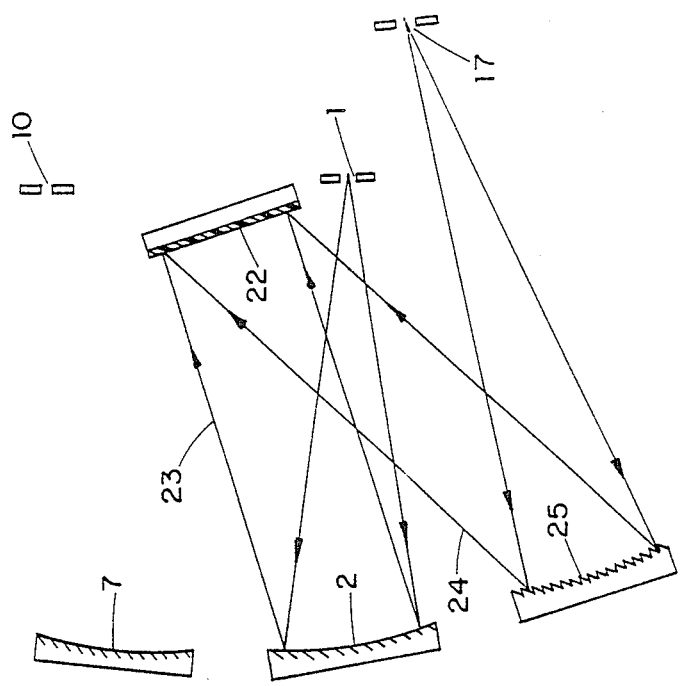
FIGS. 2a and 2b illustrate the two successive stages of the method of recording the plane grating in accordance with the invention.
Figure 2A:
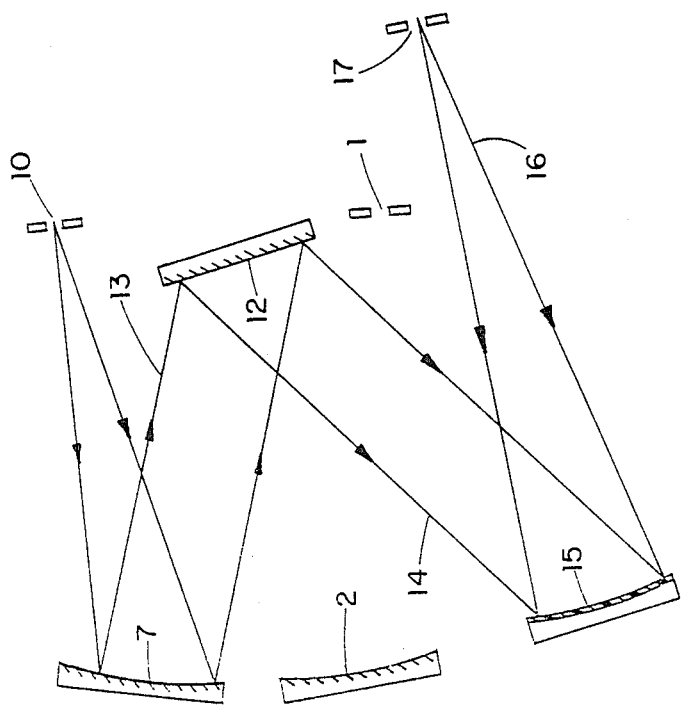

The particular method of holographically recording flat diffraction grating 4 involves an initial stage of provisionally creating an auxiliary concave holographic grating and a subsequent stage of creating plane grating 4. As will be evident from FIGS. 2a and 2b, both spherical mirrors 2 and 7 and slits 1 and 10 remain at the points they are located at in the operation illustrated in FIG. 1.

In the initial stage (FIG. 2a) the flat grating is replaced with a plane mirror 12. Slit 10 is employed in the capacity of an entry slit for monochromatic light of a wavelength $1_o$, preferably within the range that will subsequently be employed in the apparatus. Spherical mirror 7 now reflects a parallel pencil 13 of light that mirror 12 reflects in the form of another parallel pencil 14.

A spherical surface 15, coated with a photosensitive resin as is conventional for recording holographic gratings, is positioned in the path of parallel pencil 14. Spherical surface 15 is simultaneously illuminated with a divergent pencil 16 of monochromatic light of the same wavelength $1_o$ as parallel pencil 14, coming from a slit 17 located at the center of spherical surface 15. Once the interference fringes of pencils 14 and 16 has been imprinted on spherical surface 15, the surface is treated in the conventional manner to obtain a concave holographic grating 25 (FIG. 2b) with lines that represent the intersection of the complex interference surfaces and spherical surface 15.

In the second stage of the operation (FIG. 2b) the auxiliary concave grating 25 obtained in the initial stage is positioned at the same point as surface 15 and plane mirror 12 is replaced with a plane surface 22 coated, again as conventional for recording holographic gratings, with a photosensitive resin. Surface 22 is then illuminated with an initial parallel monchromatic pencil 23 of wavelength $1_o$ deriving from slit 1 and reflected by mirror 2. Surface 22 is simultaneously illuminated with another parallel monochromatic pencil 24 of the same wavelength $1_o$ deriving from slit 17 and reflected by grating 25. It will be evident that, since grating 25 was recorded by the interferences of parallel pencil 14 and divergent pencil 16 deriving from slit 17, it is necessary only to illuminate grating 25 with a single pencil from slit 17 for that pencil to be reflected on the surface in the form of a pencil 24 with the same property as that of recording pencil 14, parallel and aimed at the surface 22 that replaces mirror 12.

Once the interference fringes of pencils 23 and 24 have been exposed on the coating on surface 22, the surface is treated in the conventional manner to obtain a plane holographic grating with lines that represent the intersection of surface 22 and the interference surfaces of parallel pencils 23 and 24. It is this plane grating that is employed as the grating 4 in the apparatus illustrated in FIG. 1.

The interference surfaces of the plane waves of parallel pencils 23 and 24 are generally equidistant parallel planes, and their intersection with plane 22 results in a plane grating with parallel and equidistant lines. The aberrations introduced by spherical mirror 2, however, translate into aberrations in the planarity of the waves of pencil 23. The planarity of the waves of pencil 24 (FIG. 2a) is also subject to aberrations introduced by mirror 7, and the same planar aberrations are found in pencil 24 (FIG. 2b) subsequent to reflection onto grating 25, which has been recorded with pencil 14. The result is that the generally parallel and equidistant lines of grating 4 also have very small aberrations in parallelism and in the regularity of their pitch.

Most importantly, the aberrations thus intentionally created in the arrangement of grating 4 allows a definite correction in the aberrations introduced parasitically by spherical mirrors 2 and 7.

EXAMPLE

A monochromator of the type illustrated in FIG. 1 has been created for an operation wavelength of 4880 Å. Mirrors 2 and 7 have focal distances of 639.699 and 639.226 mm respectively. The plane grating has 1200 lines per millimeter. The angle of the axis of the incident pencil deriving from slit 1 to the axis at the apex of mirror 2 is 4.29421°. Grating 4 receives parallel pencil 3 at an incidence of 8.130° and reflects wavelength 4880 Å at an angle of 26.370°. The reflected pencil is at an angle of 4.82568° to the normal at the apex of mirror 7. A spherical surface 15 with a diameter of 938 mm and a recording wavelength of 4880 Å is employed for auxiliary grating 25.

Subject to these conditions the quality of the image of the entry slit is much better. Astigmatism in particular has been decreased, and the results indicated by the table are obtained for entry and exit slits 1 mm high and 0.005 mm wide.

TABLE 1

|  | Wavelength Å | Uncorrected grating | Corrected grating |
|---|---|---|---|
| Height of astigmatism (mm) | 3131 | 1.4 | 0.5 |
|  | 4880 | 1.4 | 0 |
|  | 5460 | 1.4 | 0.15 |
| Resolution (Å) | 3131 | 0.24 | 0.12 |
|  | 4880 | 0.20 | 0.08 |

TABLE 1-continued

| Wavelength Å | Uncorrected grating | Corrected grating |
|---|---|---|
| 5460 | 0.20 | 0.08 |

I claim:

1. Method of making a correcting plan holographic grating within one band of wavelengths, intended for use in a diffraction apparatus in which light emitted by an entry source is collimated by a spherical mirror to the grating, which reflects parallel pencils to another spherical mirror, a focusing mirror, to construct a spectrum, characterized in that it comprises the two successive stages of A. creating an auxiliary spherical grating by holographically recording the interference fringes of two monochromatic pencils of the same wavelength ($1_o$) within the correction band on a blank having a spherical surface,
   a parallel pencil generated by one of the spherical mirrors in the apparatus from a source located at the associated operational focal point subsequent to reflection onto a plane mirror located at the grating, and
   a divergent pencil arriving from another source located at the center of the spherical surface,
   on said spherical concave surface, and B. creating the final plane grating by holographically recording the interference fringes of two monochromatic pencils of the same wavelengths ($1_o$) employed in the initial stage,
   a parallel pencil generated by the other spherical mirror in the apparatus from a source located at the associated operational focal point, and
   a parallel pencil generated by reflection onto the auxiliary grating from another source located at the center of the surface that the grating is recorded on,
   on a plane surface positioned where the grating usually is within the apparatus.

2. A method of making an aberration correcting holographic optical element for use in an instrument incorporating said aberration correcting holographic optical element, first and second slits, and first and second uncorrected optical elements, comprising the steps of:

(a) maintaining the first uncorrected optical element in the position desired during operation of the instrument;

(b) illuminating with a first source of light positioned at the position of said first slit a photosensitive intermediate holographic blank with light reflected by said first uncorrected optical element;

(c) illuminating said intermediate holographic blank with a second source of light simultaneously with the illuminating of the intermediate holographic blank with light reflected by said first uncorrected optical element, to record the aberrations of said first uncorrected optical element on the intermediate holographic blank;

(d) developing said intermediate holographic blank to form an intermediate holographic element and maintaining it in the position in which it was recorded on;

(e) maintaining the second uncorrected optical element in the position which it is to occupy during operation of the instrument;

(f) maintaining a photosensitive final holographic blank in the position which the aberration correcting holographic grating being made is to occupy during operation of the instrument;

(g) illuminating the intermediate holographic element with said second source of light positioned as in illuminating step (c) to reflect light from said intermediate element onto said photosensitive final holographic blank;

(h) illuminating said photosensitive final holographic blank with an optical source positioned at said second slit which is reflected by said second uncorrected optical element simultaneously with the illumination of said photosensitive final holographic blank with light reflected from said intermediate holographic element, to record the aberrations of said first uncorrected optical element on the final holographic blank with the intermediate holographic element and to record the aberrations of said second uncorrected optical element on the final holographic blank with the second uncorrected optical element; and (i) developing said final holographic blank to form a final holographic optical element.

3. A method of making an aberration correcting holographic optical element for use in an instrument incorporating said aberration corrected holographic optical element and first and second uncorrected optical elements as in claim 2, wherein said first uncorrected optical element performs a focusing function.

4. A method of making an aberration correcting holographic optical element for use in an instrument incorporating said aberration corrected holographic optical element and first and second uncorrected optical elements as in claim 3, wherein said second uncorrected optical element performs a focusing function.

5. A method of making an aberration correcting holographic optical element for use in an instrument incorporating said aberration corrected holographic optical element and first and second uncorrected optical elements as in claim 2, wherein said illumination by said first and second sources of light is done by low aberration light sources.

6. A method of making an aberration correcting holographic optical element for use in an instrument incorporating said aberration corrected holographic optical element and first and second uncorrected optical elements as in claim 5, wherein said illumination by said first and second sources of light is done by slits.

7. A method of making an aberration correcting holographic optical element for use in an instrument incorporating said aberration corrected holographic optical element and first and second uncorrected optical elements as in claim 2, further comprising the step of replicating said final holographic optical element.

8. A method of making an aberration correcting holographic optical element for use in an instrument incorporating said aberration corrected holographic optical element and first and second uncorrected optical elements as in Claim 2, wherein the final holographic blank is selected to be planar in shape.

9. A method of making an aberration correcting holographic optical element for use in an instrument incorporating said aberration corrected holographic optical element and first and second uncorrected optical elements as in claim 8, wherein illumination of said final blank forms a planar diffraction grating.

10. A method as in claim 9, wherein said illuminating step (b) is performed by light reflecting from said first uncorrected optical element to a planar mirror positioned at the place where said aberration corrected holographic optical element is to be placed in said instrument.

11. A method as in claim 2, wherein the source of all illuminating steps are divergent pencils.

12. A method of making an aberration correcting holographic optical element for use in an instrument incorporating said aberration correcting holographic optical element and first and second uncorrected optical elements, comprising the steps of:

(a) maintaining the first uncorrected optical element in the position desired during operation of the instrument;

(b) maintaining a third uncorrected optical element in the position to be coupled in the instrument by said aberration correcting holographic optical element being made;

(c) illuminating with a first source of light a photosensitive intermediate holographic blank with light reflected by said first uncorrected optical element onto said third uncorrected optical element and then onto said intermediate holographic blank;

(d) illuminating said intermediate holographic blank with a second source of light simultaneously with the illuminating of the intermediate holographic blank with light reflected by said first uncorrected optical element, to record the aberrations of said first uncorrected optical element on the intermediate holographic blank;

(e) developing said intermediate holographic blank to form an intermediate holographic element and maintaining it in the position in which it was recorded on;

(f) maintaining the second uncorrected optical element in the position which it is to occupy during operation of the instrument;

(g) maintaining a photosensitive final holographic blank in the position which the aberration correcting holographic grating being made is to occupy during operation of the instrument;

(h) illuminating the intermediate holographic element with said second source of light positioned to reflect light from said intermediate element onto said photosensitive final holographic blank;

(i) illuminating said photosensitive final holographic blank with a third source of light which is reflected by said second uncorrected optical element simultaneously with the illumination of said photosensitive final holographic blank with light coming from said second source and reflected from said intermediate holographic element, to record the aberrations of said first uncorrected optical element on the final holographic blank with the intermediate holographic element and to record the aberrations of said second uncorrected optical element on the final holographic blank with the second uncorrected optical element; and (j) developing said final holographic blank to form a final holographic optical element.

13. A method of making an aberration correcting holographic optical element for use in an instrument incorporating said aberration corrected holographic optical element and first and second uncorrected optical elements as in claim 12, wherein said first uncorrected optical element performs a focusing function.

14. A method of making an aberration correcting holographic optical element for use in an instrument incorporating said aberration corrected holographic optical element and first and second uncorrected optical elements as in claim 13, wherein said second uncorrected optical element performs a focusing function.

15. A method of making an aberration correcting holographic optical element for use in an instrument incorporating said aberration corrected holographic optical element and first and second uncorrected optical elements as in claim 12, wherein said illumination by said first and second sources of light is done by low aberration light sources.

16. A method of making an aberration correcting holographic optical element for use in an instrument incorporating said aberration correcting holographic optical element and first and second uncorrected optical elements as in claim 15, wherein said illumination by said first and second sources of light is done by slits positioned where slits in the instrument are positioned.

17. A method of making an aberration correcting holographic optical element for use in an instrument incorporating said aberration corrected holographic optical element and first and second uncorrected optical elements as in claim 12, further comprising the step of replicating said final holographic optical element.

18. A method of making an aberration correcting holographic optical element for use in an instrument incorporating said aberration corrected holographic optical element and first and second uncorrected optical elements as in claim 12, wherein the final holographic blank is selected to be planar in shape.

19. A method of making an aberration correcting holographic optical element for use in an instrument incorporating said aberration corrected holographic optical element and first and second uncorrected optical elements as in claim 18, wherein illumination of said final blank forms a planar diffraction grating.

20. A method of making an aberration correcting holographic optical element for use in an instrument incorporating said aberration corrected holographic optical element and first and second uncorrected optical elements as in claim 12, wherein said illumination is done at a wavelength within the range of wavelengths at which the instrument is to be used.

21. A method as in claim 12 wherein said third uncorrected optical element is a plane mirror.

22. A method as in claim 12, wherein said first source is positioned in a position to be occupied by a source which is to illuminate said first uncorrected optical element during use of said aberration converting holographic optical element and wherein said third source is positioned in a position to be occupied by a source which is to illuminate said first uncorrected optical element during use of said aberration converting holographic optical element.

23. A method as in claim 12, wherein the positions add characteristics of said first uncorrected optical element, said second uncorrected optical element, said aberration correcting optical element and said first and third sources are selected to allow light emitted at the position of said first source to fall upon and be focused by said first uncorrected element and fall upon said aberration correcting element, be reflected by said aberration correcting element to said second uncorrected element and be reflected and focused by said second uncorrected element for analysis at the position of said third source, with said aberration correcting optical element acting as a diffraction grafting.

24. A diffraction apparatus incorporating an aberration correcting holographic optical element and first and second uncorrected optical elements, said optical element made using the method comprising the steps of:
 (a) illuminating with a first source of light a photsensitive intermediate holographic blank with light reflected by said first uncorrected optical element;
 (b) illuminating said intermediate holographic blank with a second source of light simultaneously with the illuminating of the intermediate holographic blank with light reflected by said first uncorrected optical element, to record the aberrations of said first uncorrected optical element on the intermediate holographic blank;
 (c) developing said intermediate holographic blank to form an intermediate holographic element;
 (d) illuminating the intermediate holographic element with a second source of light positioned to reflect light from said intermediate element onto a photosensitive final holographic blank;
 (e) illuminating said photosensitive final holographic blank with an optical source which is reflected by said second uncorrected optical element simultaneously with the illumination of said photosensitive final holographic blank with light reflected from said intermediate holographic element, to record the aberrations of said first uncorrected optical element on the final holographic blank by the intermediate holographic element and to record the aberrations of said second uncorrected optical element on the final holographic blank with by the second uncorrected optical element; and
 (f) developing said final holographic blank to form a final holographic optical element.

25. A method of making an aberration corrected system incorporating an aberration correction optical element, a plurality of aberration causing optical elements, an optical inlet and an optical output, comprising the steps of recording aberrations associated with the optical geometric shape and the position of a respective aberration causing optical element on an intermediate holographic element and recording on said aberration correcting optical element the aberrations associated with said respective element using said intermediate elements and abberations associated with the optical geometric shape and position of another aberration causing optical element using said other element.

* * * * *